US009203263B2

(12) United States Patent
Borras et al.

(10) Patent No.: US 9,203,263 B2
(45) Date of Patent: Dec. 1, 2015

(54) METHODS AND SYSTEMS FOR PROVIDING AN APPLIANCE HYBRID MODE

(75) Inventors: Jaime A. Borras, Miramar, FL (US); Elizabeth Owens, Winnetka, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 682 days.

(21) Appl. No.: 13/351,880

(22) Filed: Jan. 17, 2012

(65) Prior Publication Data

US 2012/0319491 A1 Dec. 20, 2012

Related U.S. Application Data (60) Provisional application No. 61/433,740, filed on Jan. 18, 2011.

(51) Int. Cl.
*H02J 1/00* (2006.01)
*H02J 3/00* (2006.01)
*H02J 9/00* (2006.01)
*H02J 7/00* (2006.01)
*H02J 3/06* (2006.01)
*H02J 9/06* (2006.01)

(52) U.S. Cl.
CPC ... *H02J 9/00* (2013.01); *H02J 3/06* (2013.01); *H02J 7/00* (2013.01); *H02J 9/062* (2013.01); *Y10T 307/625* (2015.04); *Y10T 307/696* (2015.04)

(58) Field of Classification Search
CPC ............... H02J 7/00; H02J 9/00; H02J 9/002; Y10T 307/625

USPC ................................................ 307/66, 85, 86
See application file for complete search history.

(56) References Cited

U.S. PATENT DOCUMENTS

| 2007/0005195 | A1* | 1/2007 | Pasquale et al. ............... 700/295 |
| 2009/0027932 | A1* | 1/2009 | Haines et al. ................... 363/95 |
| 2010/0141153 | A1* | 6/2010 | Recker et al. ................. 315/149 |
| 2011/0133655 | A1  | 6/2011 | Recker et al. |

FOREIGN PATENT DOCUMENTS

WO 2010042550 A2 4/2010

OTHER PUBLICATIONS

Canadian Patent Office, Requisition by Examiner, in Application No. 2,801,742, dated Sep. 15, 2014 (2 pages).
Examiner's Requisition, Canadian Application No. 2,764,715, dated Nov. 15, 2013, pp. 1-2.

* cited by examiner

*Primary Examiner* — Carlos Amaya
(74) *Attorney, Agent, or Firm* — McAndrews, Held & Malloy, Ltd.

(57) ABSTRACT

A hybrid energy management method and system which provides a main power supply and a secondary power supply. The main power supply is electrically coupled to the utility power grid, while the secondary power supply is electrically isolatable from the utility power grid. A switch is provided to selectably power the appliance through the main alternating current power supply when the utility is not in a reduced demand operating mode and to selectably power the appliance through the secondary alternating current power supply when the utility is in a reduced demand mode.

18 Claims, 7 Drawing Sheets

METHODS AND SYSTEMS FOR PROVIDING AN APPLIANCE HYBRID MODE

CROSS REFERENCE TO RELATED APPLICATION

This application is a non-provisional application claiming priority from U.S. Provisional Application Ser. No. 61/433,740, filed Jan. 18, 2011, entitled "Appliances Hybrid Mode," the contents of which is incorporated herein by reference in its entirety.

FIELD OF THE DISCLOSURE

The present disclosure generally relates to managing the energy usage of an appliance, and more particularly, to methods and systems for providing an appliance hybrid mode.

BACKGROUND

The current "smart grid" initiative using "smart meters" is driving appliance and equipment manufacturers to provide connectivity that can respond to and control the peak energy loads in residential and business settings. Smart meters raise consumer awareness of the cost and impact of electric devices. Such devices typically utilize ZigBee® communication protocol for wireless home area networks relying upon different energy profiles to deliver both energy and other information. As ZigBee® is a relatively low data rate wireless protocol that does not support streaming of content or downloads for remote software updates and applications, WiFi is used complementarily.

For instance, ZigBee is a wireless language connecting different devices to work together. Available ZigBee networks provide a suggested standard for deploying switches, sensors, and controllers using harvested energy in residential, commercial and, industrial environments. The ZigBee networks include a physical radio using IEEE 802.15.4 standard radios operating in a 2.4 GHz band. The proposed ZigBee standard seeks to provide interference avoidance, mesh networking, security, certification, and an open standard.

The emerging Smart Grid provides residential users flexibility in controlling their electricity costs. A primary driving force is the smart meter which can deliver near real-time electricity prices to homes. The consumer can make use of this information via an in-home energy management controller, which uses prices and user preferences to control power usage across the home. The energy management unit, which may be standalone or embedded in the smart meter or appliance.

Figure 1:
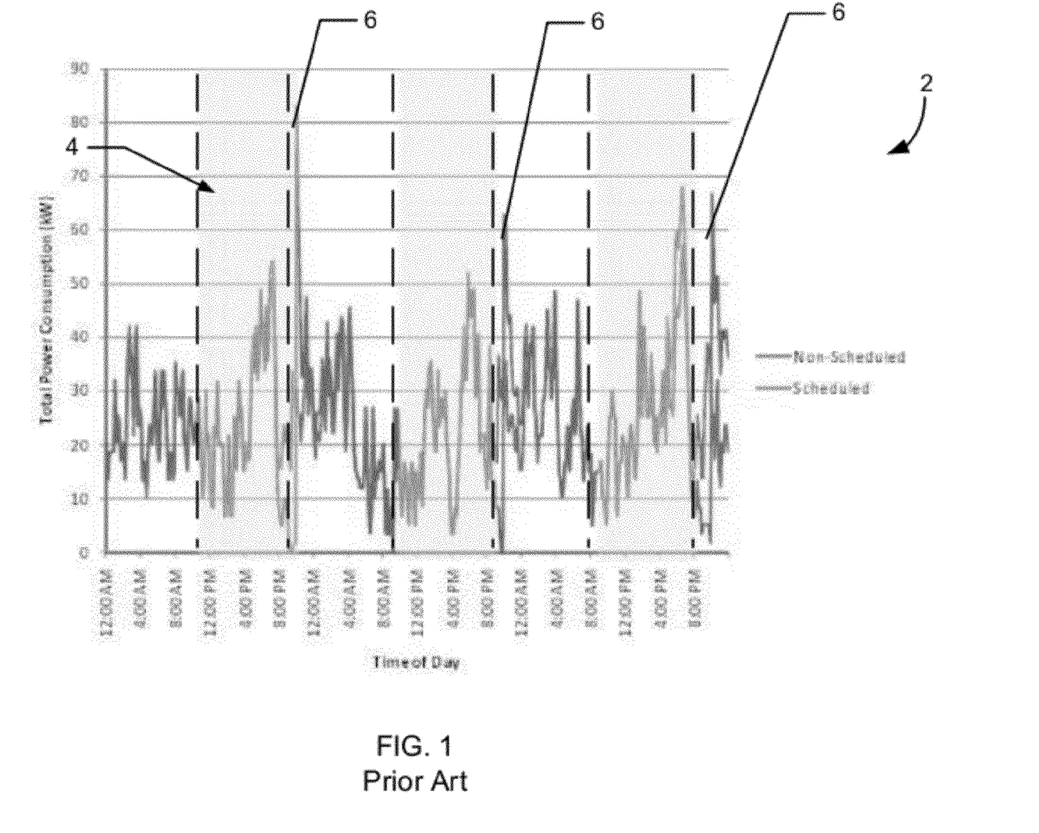
FIG. 1 is prior art plot showing a simulation of a "rebound" peak problem at the end of a pricing peak period.

The problem observed with the Smart Grid unit is that there is a "rebound" effect wherein the "scheduled" energy management includes more peaks than the "non-scheduled" solution, thereby negating benefits of off-peak pricing models. For example, FIG. 1 shows a prior art simulation of an identified "rebound" problem that occurs at the end of a peak pricing period as identified by L. Snyder, S. Kishore, "Control Mechanisms for Residential Electricity Demand in Smart Grids", IEEE Smart Grid Communications Conference, October 2010. Specifically, FIG. 1 illustrates a plot 2 of the total power consumption of a simulated fifty home community over a three day period. As noted, a utility company may provide information regarding various peak pricing periods 4 throughout a predetermined time period. The consumer can make use of this information via the in-home energy management controller (EMC) to delay power usage until the end of the peak pricing period 4.

Although the scheduled system reduces the peak demand to a small extent, it also creates a new, even larger "rebound" peak 6, immediately after the peak pricing period 4 ends and off-peak prices begin. As illustrated, the maximum load is larger in the scheduled system than in the non-scheduled system (83.2 vs. 68.0 kW), as is the standard deviation of the load across periods (13.2 vs. 11.3 kW). This rebound peak 6 occurs even though the request intensity during off-peak hours is low. Therefore, it is clear that the off-peak pricing model fails to achieve its goal of reducing load peaks, and may even worsen the problem.

To overcome the "rebound" peak 6, the previous system proposed a complex power scheduling protocol in a Smart Grid system, as well as two optimization methods for choosing the timing of appliance operation within a home. The authors distributed scheduling mechanism guarantees homes a base power level while allowing them to compete for the remaining available power. The acknowledged problem being that the proposed optimization methods are complex in nature and do not work for all power grid configurations.

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing hybrid energy management for an appliance is disclosed herein. In general, the disclosed examples allow for the monitoring and/or control of smart grid enabled appliances in a local household and/or community, and the utilization of the appliance on battery power when economically feasible. In this way, the utility provider may be able to provide finer energy control at the business, consumer house, and/or community, while the utility customer will achieve energy management, including possible price reductions. In some embodiments, because the described examples include the ability to operate various appliances/devices outside of the direct control of the smart grid, the disclosed systems may alleviate the "loss of control" concern sometimes felt by the electrical user.

The example systems disclosed herein allow for the interoperability of different manufacturers of smart household appliances, either through built-in devices, or externally connected devices, to monitor the community of device's electrical usage. In one example an external and/or internal Energy Management Unit (EMU) measures the energy consumption of the connected appliance and/or other electrical device and stores data regarding the energy usage. The EMU may be provided with a capability to regulate the power consumption of a device and/or the capability to switch the device on and off. The energy consumption data is transmitted to a home hub, which processes the energy usage data from all connected devices and schedules the device usage utilizing any suitable algorithm, including, for example a first-in, first-out algorithm, a prioritized algorithm, and/or any suitable combination thereof.

In one example, the system provides the use of commodity hardware, off the shelf software, OS independent applications, form factor independent devices (PC, tablets, smart phones, etc), media independent (voice, text, video) and a cloud based infrastructure to run all functionalities of the appliance connectivity. This is in contrast to the specialized hardware, proprietary software and/or dedicated, non-interconnected processors that typically run current appliances. In the context of a consumer environment, such as for example, a residence, the disclosed methods and systems are particularly useful for providing enhanced services as will be described in detail herein.

Still further, The disclosed methods and systems allow the consumer to continue to operate the appliance when they need it without an increase in the utility monthly bill. For instance, the Hybrid mode allows the appliance to continue to operation from a battery when the utility energy price is the highest, e.g., when demand response is active, without incurring any punitive costs associated with operating an appliance during the time when demand response is active. Thus, the present disclosure can also lower the operational cost and the amount of energy usage by operating the appliance from a battery.

A Hybrid mode of operation that alters the appliance's electrical source from external power line, AC (Alternating Current), to internal DC (Direct Current) from a battery during the Demand Response period. The present system provides peace of mind to the consumer because they can continue to operate their appliances during the peak periods and at a lower cost.

Figure 2:
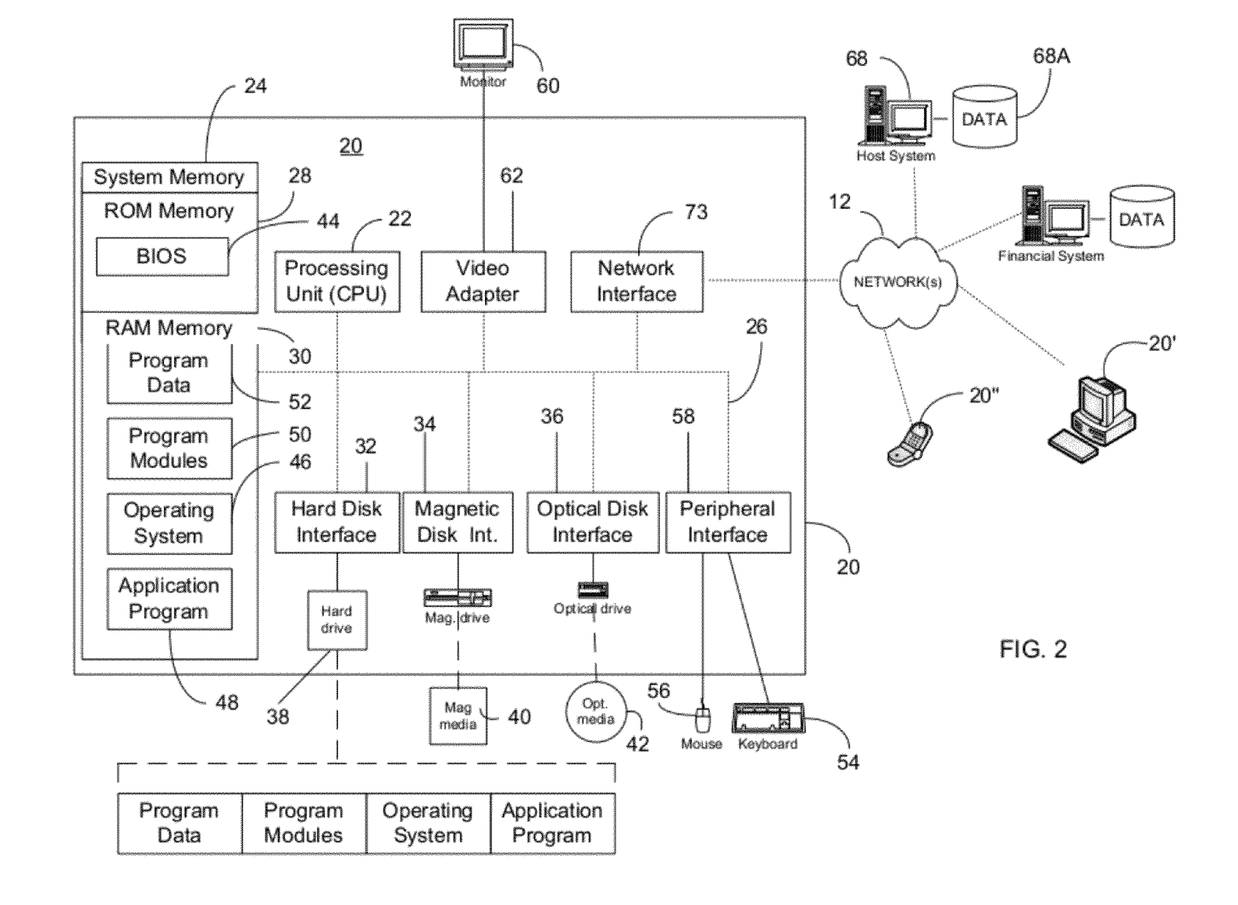
FIG. 2 is illustrates in block diagram form components of an example, computer network environment suitable for implementing the example community energy management system disclosed.

With reference to the figures, the following discloses various example systems and methods for providing community energy management. To this end, FIG. 2 illustrates a processing device 20", illustrated in the exemplary form of a mobile communication device, a processing device 20', illustrated in the exemplary form of a computer system, and a processing device 20 illustrated in schematic form, such as for example, an appliance, are provided with executable instructions to, for example, provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 2 may be embodied in any device having the ability to execute instructions such as, by way of example, an appliance, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this example, the server 68 may act as a scheduler as described herein. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving information regarding at least one appliance's energy usage, receiving information regarding the operation of the smart grid, and providing a scheduling service to coordinate the use of the appliance.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 3:
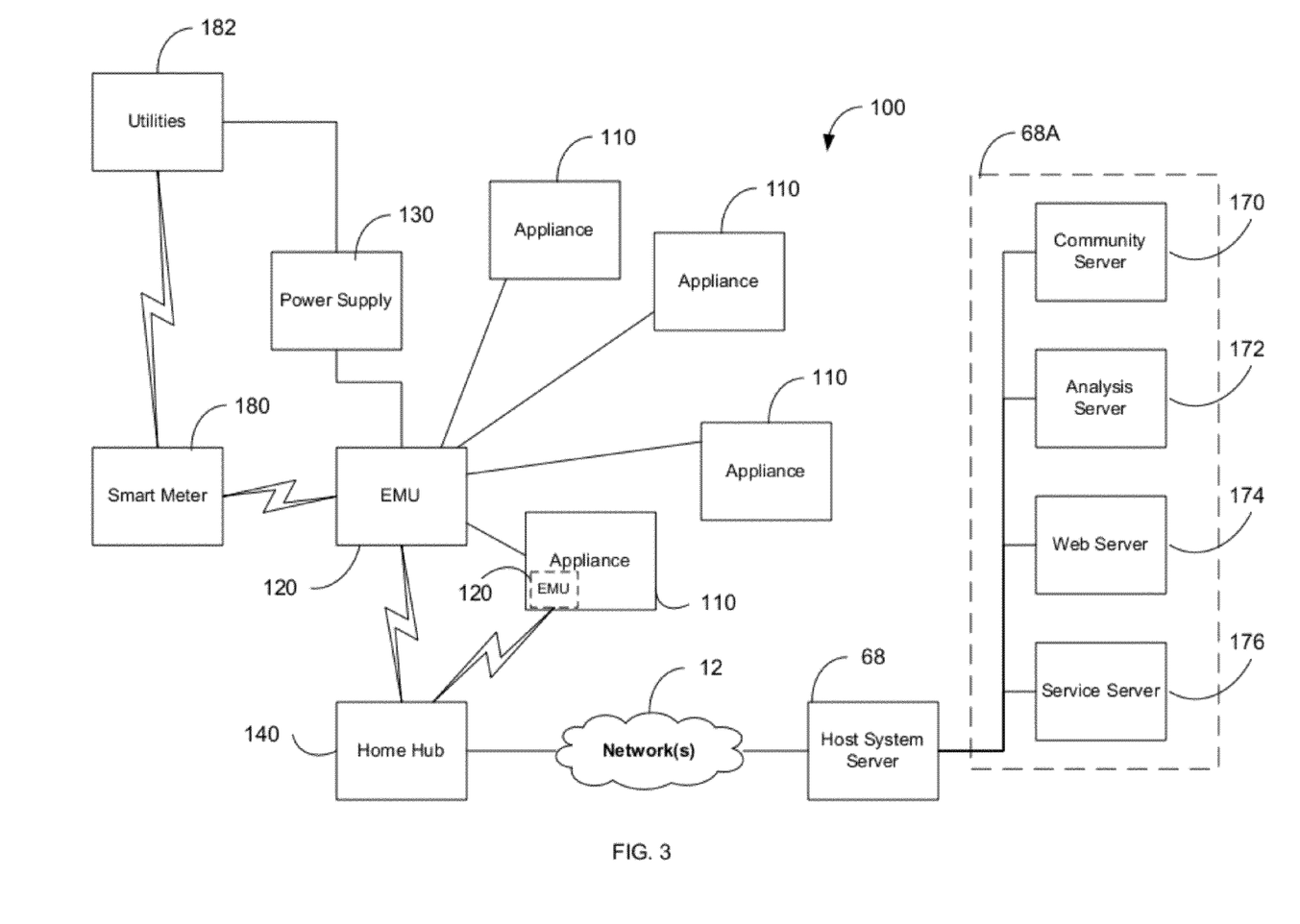
FIG. 3 is a system diagram of an example community energy management configuration.

FIG. 3 illustrates an example community energy management system 100 in accordance with one example of the present disclosure. In this example, the system 100 comprises at least one electronic device, such as a home appliance 110 in communication with one or more Energy Management Unit (EMU) 120. The example EMU 120 may be a smart grid compatible, energy monitoring device externally connected via a wall-plug form factor, internally connected (i.e. built-in) to the at least one appliance 110, or otherwise suitably electrically coupled to the appliance 110. In the illustrated example, one EMU 120 is shown as an external device that plugs directly into an ordinary 120 volt, 60 Hz electrical socket 130, while another EMU 120 is shown as being integrally contained within the appliance 110. It is further contemplated that the EMU 120 may be adapted to plug and/or electrically couple into any suitable power supply including for instance an electrical socket of any suitable voltage and/or prong geometry. It will also be appreciated that the EMU 120 may be powered via any suitable electrical supply including, for example, direct AC and/or DC supplies.

As noted above, the appliance 110 may be any electronic device, such as for example, a washing machine, a dryer, a refrigerator, a television, a coffee maker, etc. It will be understood that there are many other appliances and/or pieces of equipment that may be used with the EMU 120 without departing from the spirit of the present disclosure. Furthermore, it will be appreciated that if multiple EMUs 120 are utilized in the system 100, each EMU may be optionally adapted to communicate with multiple appliances 110, with other EMU(s) 120, and/or communicate with a home hub 140 as will be described.

Figure 4:
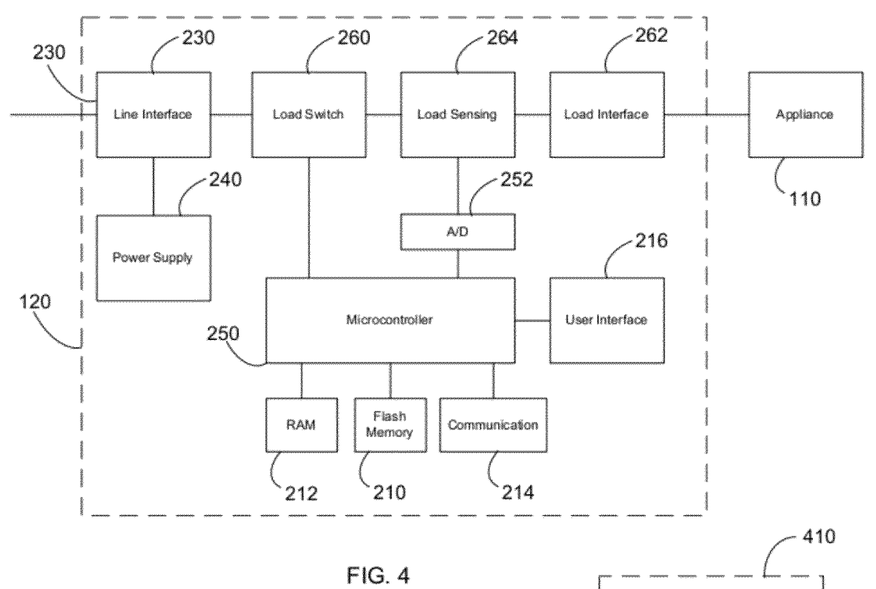
FIG. 4 is a component diagram of the example Energy Management Unit utilized in the system diagram of FIG. 3.

At least one example EMU 120 is configured to measure the energy usage of the connected appliance(s) 110 or other piece(s) of equipment. Still further, at least one example EMU 120 is configured to store the energy usage data of the connect appliance(s) in its own memory. For instance, as illustrated in FIG. 4, an example EMU 120 includes a flash memory 210 and/or a random access memory (RAM) 212 to store the collected energy use data. The EMU 120 may use other types of memory in addition to, or in lieu of, flash memory 210 and RAM 212 to store the energy use data. The energy use data is, in turn, transmitted to the home hub 140 (see FIG. 3) such as, for example, a personal computer (PC), terminal, router, smartphone, tablet, or other suitable device via a communicator 214, such as a wireless connection using the local area network with WiFi, ZigBee®, Bluetooth, infrared, or the like. While the connection between the EMU 120 and the home hub 140 is illustrated as being a communicator 214, a person of ordinary skill in the art will recognize that the data connection may be any suitable connection including a wired and/or wireless connection as desired. Software, firmware, and/or hardware executing and/or contained within the home hub 140 processes the transmitted energy use data generated by the connected appliance 110 and EMU 120 and is adapted to at least one of display the data on an integrated and/or external display having a user interface 216, and/or transmit the data to the host system server 68, or other suitable service, such as a cloud service through the network 12, including an Internet, cellular, wireless, wired, LAN, tethered, and/or any other suitable connection.

In the illustrated example, the transmitted energy use data is segregated into different services and/or servers within the data repository 68A as shown in FIG. 3, including a community server 170, an analytics server 172, a web server 174, or a service server 176. While the energy use data is segregated in the illustrated example, the data need not be divided or alternatively may be divided even further as desired. The example EMU 120 facilitates the ability for an operator to offer consumers cost saving recommendations and usage optimization.

Referring again to FIG. 3, the home hub 140 may also transmit energy use data to a smart meter 180, via a wireless connection using ZigBee® or the like. In this example, the smart meter 180 is a typical electrical meter that records consumption of electric energy in predefined intervals, such as intervals of an hour or less and communicates consumption information back to a utility company 182 for monitoring and/or billing purposes. Typically, the smart meter 180 enables two-way communication between the meter and a central system. Accordingly, the utility company 182 providing the power to the appliance 110 and/or other equipment, can access the energy use data stored on the smart meter 180 for further review.

Figure 5:
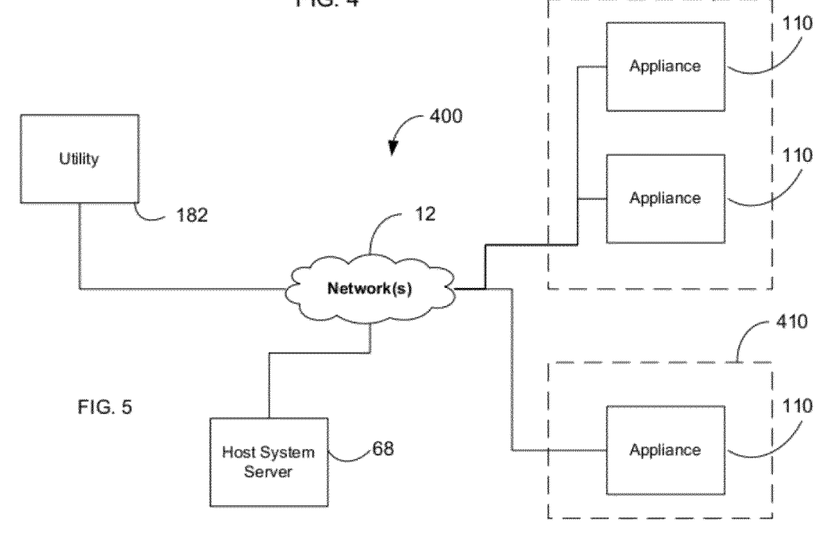
FIG. 5 is a system diagram of an example community of electronic devices.

Referring now to FIG. 5, an example energy management community 400 is illustrated showing a plurality of home hubs 140 communicating with the utility 182 and the network 12. In the illustrated example, the utility 182 is capable of communicating with the home hubs 140 via any suitable means including, for example, via a cellular network. Each of the example home hubs may be distributed in a subset of the community, such as for example, a single home 410, or may be located in multiple homes 410, such as for example, in a residential neighborhood. In the example community 400, the energy consumption data for each appliance 110 connected to each EMU 120 communicating with each of the connected home hubs 140 is collected and forwarded through the network 12 to the analytics server 172. For instance, the analytics server 172 may collect any relevant data including, for example, appliance information for each registered appliance 110, power drain consumption (PD), Power drain per cycle (PCy), length of operational cycle (TL), utility demand response (DR) information, total amount of home power load allowed during the utility demand response (DR), and/or any other suitable data. It will be appreciated that this information may be provided in any suitable manner, including for example, by manually entering the data, registering the appliance, automatically detecting the information, by a third-party, by the manufacturer, and/or any other suitable method.

One example EMU 120 for use in the community 400 is shown in FIG. 4. The example EMU 120 comprises a line interface 230 which is inductively coupled to the power line to rectify and provide line powered DC voltage 240 to a microcontroller 250, the memories 212, 210, an analog-to-digital (A/D) converter 252, the communicator 214, and the user interface 216. A load switch 260, such as for example, a solid state relay removes or applies power to the coupled appliance 110 through a load interface circuit 262. The example load switch 260 and the example load interface 262 are in series with a load monitoring/sensing circuit 264. The example load monitoring/sensing circuit 264 provides a stepped-down current signal which is within the operating range of the A/D converter 252 for subsequent sampling by the microcontroller 250. As previously described, the communicator 214 periodically transmits energy use data to the home hub 140 via a wireless and/or wired connection using the local area network with WiFi, ZigBee®, or the like. The user interface 216 communicates the status of the EMU 120 and provide at least one user interface element which allows the user to interact with the EMU 120. For instance, the user interface 216 may provide a display on which energy use data and the like are shown to the user. Additionally, the user interface 216 may also provide one or more input user interface elements through which the user can toggle interact with the EMU 120 to retrieve further information regarding energy use, to on and/or off various appliances including the appliance 110, to customize various features and/or settings of the EMU 120 depending on the particular appliance or piece of equipment connected to the EMU 120, to customize various user preferences, etc.

Different utilities 182 may have different ways to assign the maximum power load per community 400 based upon any number of factors relative to the utilities' unique environments. In one example, it can be assumed that the total power allocated by the utility to the community 400 is based on 80% of the total peak power consumption of all the homes 410 in the community 400. Accordingly, as long as the community 400 as a whole is below the maximum power load allocation, then there is no inconvenience to the consumer of delaying usage of the appliance 110.

Figure 6:
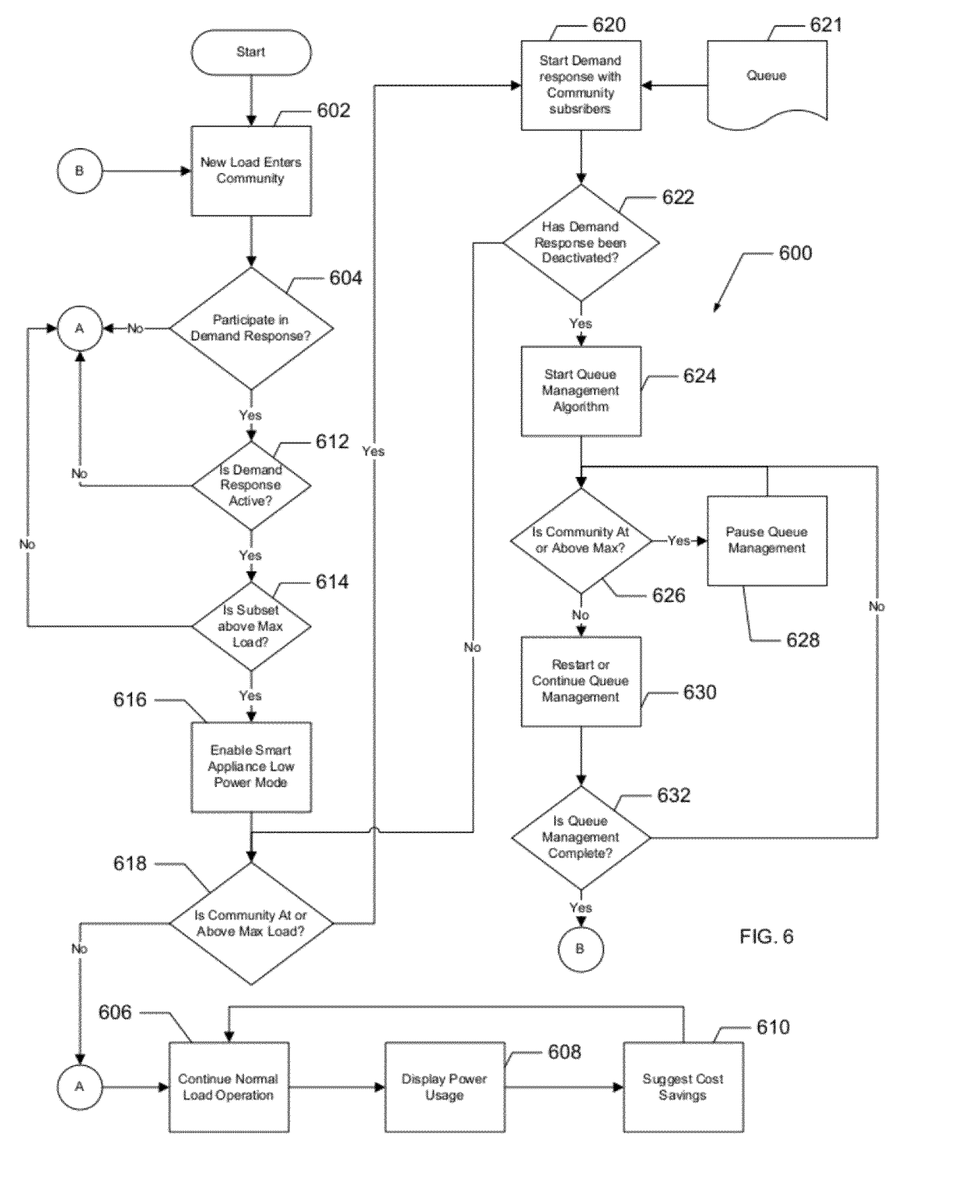
FIG. 6 is a flow chart describing an example algorithm to perform energy management for a community of electrical devices.

To provide one example method of schedule energy usage, a community energy management process 600 is shown in FIG. 6. In the illustrated example, the process 600 begins at a block 602 wherein a new load, such as a new appliance 110 is detected by at least one of the EMU 120, the home hub 140, and/or the host system 68. The detected load may include data representative of the estimated load for the device cycle. In at least one example, the data source for the estimated load is the manufacturer, the device itself, and/or the average load usage data stored, for example, in the EMU 120. The process 600 then determines whether the customer has opted to participate in a demand response pricing structure at a block 604. If the customer has not opted to participate, the process 600 continues on to a block 606 where the operation of the new load is allowed to operate normally (e.g., without any energy controlling). In this instance, allowing the appliance 110 to operate under a normal power usage may entail displaying power usage at a block 608, such as for example on the user interface 216 of the EMU 120, and may include suggested cost savings at a block 610.

If the process 600 determines that the customer has opted in to participation with demand response pricing, the process then determines in the demand response pricing is active at a block 612. If demand response pricing is not active, then the new load is allowed to operate normally at the block 606. If however, demand response pricing is active, the process 600 utilizes data collected from the utility 182 to determine if the individual total allowed home power load is above a pre-calculated level at a block 614. In this example, the individual total allowed home power load is set equally by the number of homes in the community 400. It will be appreciated, however, that many other methods of determining the individual total allowed home power load may be utilized as desired.

If the process 600 determines that the home is not above the individual total allowed home power load, the appliance 110 is allowed to operate under normal conditions. If however, the process 600 determines that the home is above the individual total allowed home power load, a command is sent at block 616 to cause the appliance 110 to operate in a low power mode (if available), and/or otherwise limit the appliance's power consumption load. In one example low power mode, the appliance 110 is still operational, but operates at a lower power consumption, thus requiring longer to complete its operation. Following the enabling of the low power load, the process 600 again utilizes data collected from the utility 182 to determine if the total allowed power load for the entire community 400 is above a pre-calculated level at a block 618. If the total community power load is below the pre-calculated level, then the process 600 continues to allow normal operation at block 606, albeit with the new appliance operating in a limited power consumption load.

If the process 600 determines that the community 400 is at or above the total community power load, then the process 600 limits any new loads at block 620 by delaying the operation of the new load until after the demand response period has ended. the delayed loads are placed in a holding queue 621 in a first-in sequence. Once new loads are delayed, the process 600 monitors and determines whether the demand response period has been deactivated at a block 622. If the demand response period has not been deactivated, the process 600 may return to block 618 to monitor the community power allocation. Thus, if the power load of the community 400 falls sufficiently, the limitation on new loads may be lifted as desired.

Once the process 600 determines that the demand response period has been deactivated, the process 600 initialized a queue management process 700 (see FIG. 7), such as a first-in, first-out (FIFO) process at a block 624. The process 700 will be described in greater detail, but in general, the process 700 allows the controlled initialization of any delayed loads while monitoring the power allocation of the community 400 to avoid the rebound peaks as noted. Specially, while the process 700 is performing, the process 600 determines whether the community 400 is at or above the total community power load at a block 626. If the process 600 determines that the community 400 is at or above the total community power load, then the process 600 suspends the process 700 at a block 628 until the total community load falls below the allocation. Once the process 600 determines that the community 400 is below the total community power load, the process 700 continues and/or restarts at a block 630 as necessary. The process 600 then determines whether the process 700 is complete at a block 632 and if not, returns to the block 626 to continue to monitor the community load level. If the process 700 is complete, the process 600 returns to the initial block 602 to await a new load to enter the community 400. In essence, the closed feedback loop provides a mechanism by which to avoid the rebound peaks associated with previous delay methods by intelligently extending the delay to turn-on loads.

Figure 7:
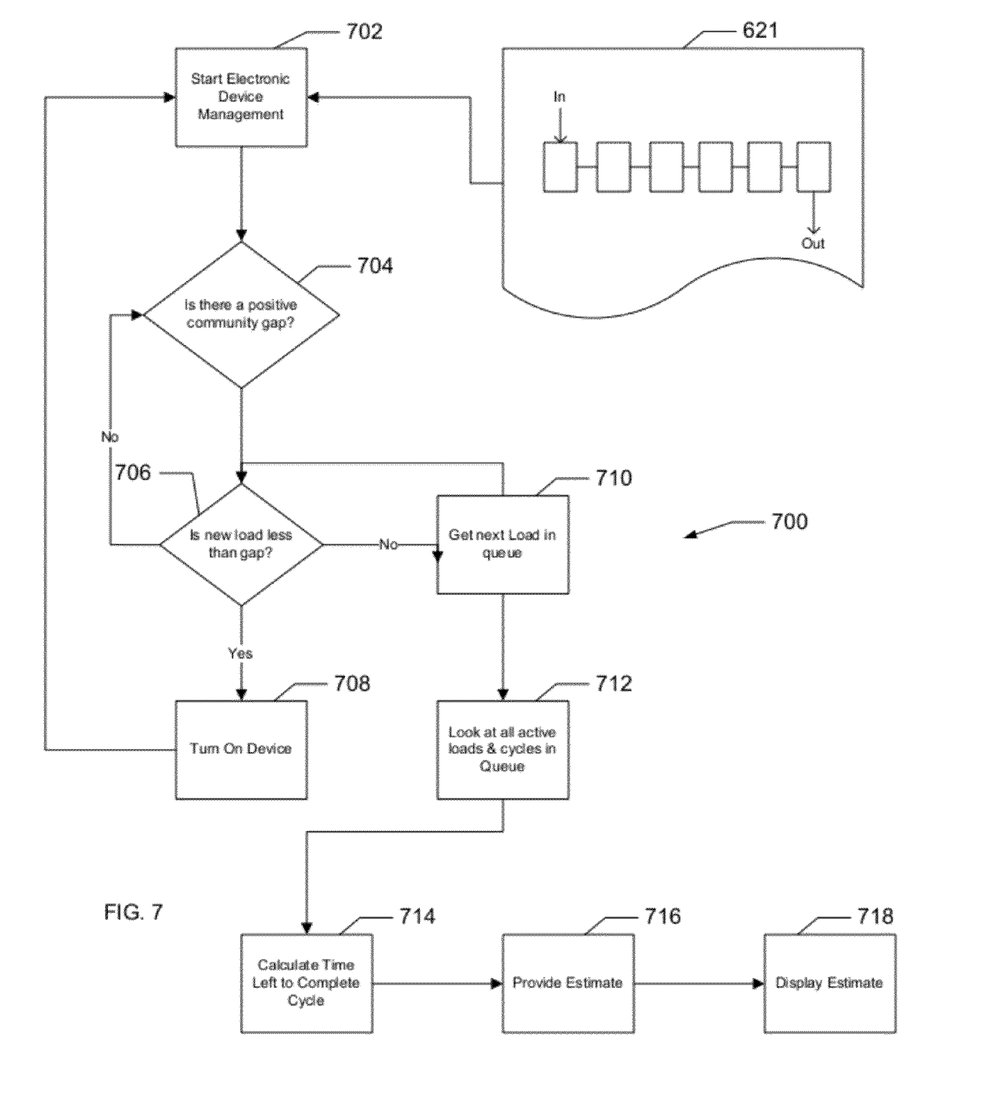
FIG. 7 is a flow chart describing an example queue management for the example algorithm to perform energy management for the community of electrical devices of FIG. 6.

Turning now to FIG. 7, an example queue management process 700 is illustrated in greater detail. In this example, the queue management process is a FIFO sequence, which generally provides that the queue of delayed loads will be initialized in a first-in, first-out sequence. In the illustrated example, the process 700 begins starting the turn-on process by obtaining the appliance from the queue 621 that was the first-in to the queue 621. The process 700 then continues on at a block 704 to determine whether there is a positive load gap between the current community load and the maximum community load level. Specially, the gap is defined as the difference between the community allocation and the actual energy consumption. If there is not a positive gap, the process 600 will continue to monitor the community load level until a gap occurs (e.g., through the disuse of an appliance in the community).

Once there is a positive gap in the community load level, the process 700 determines whether the estimated load level of the current appliance in the queue is lower than the calculated gap level at a block 706. If the estimated load level is less than the load available in the calculated gap, the appliance is turned on at a block 708 and the process 700 returns to the block 702 to process the next appliance in the queue 621. If, however, the estimated load for the current appliance is not less than the calculated gap, the process 700 looks for the next item in the queue at the block 710 and repeats the determination process at block 706. The process 700 will repeat the queue management process until all items in the queue have been started.

Concurrent with the initialization of the loads in the queue 621, the process 700 may look at all active loads and their cycles at block 712, may calculate the time left to complete the cycle a block 714, may calculate an approximate time of turn-on for each item in the queue at a block 716, and may display the calculated information to the user interface 216, or other suitable display, at a block 720. It will be appreciated that the process 700 may provide for a queue management process as is known in the art to allow a user to override, prioritize, and/or customize the queue 621.

In additional to the example method of scheduling energy usage through the community energy management process 600, the present disclosure also may provide an alternative system and method of operating an appliance. In particular, the presently disclosed systems and methods work in connection with a smart grid enabled home with a smart meter communicating with the utility for delivering total home power consumption and for receiving Demand Response signals/commands during peak electricity price periods, as already shown in FIG. 3. For example, as previously described, the Home Hub 140 receives and sends information to the smart meter 180 which then repeats the Demand Response commands to the home appliances that opted-in to disconnect them from the grid.

Figure 8:
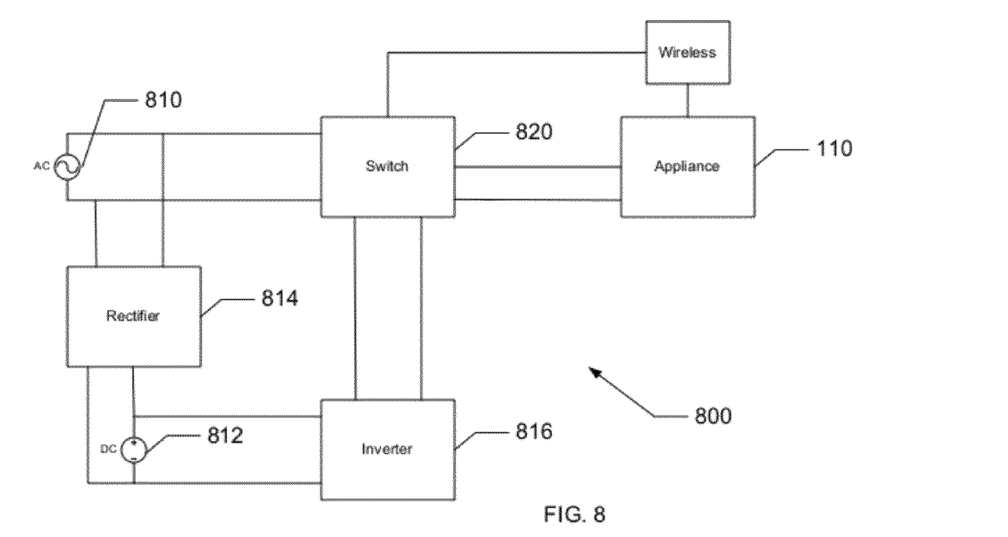
FIG. 8 is a system diagram of an example hybrid energy management system.

The present disclosure enables an appliance 110, such as for example, a washer, dryer, dishwasher, stove/oven, etc. to continue operation during the utility Demand Response period at no extra cost or additional load to the utility. As illustrated in FIG. 8, in one example, this hybrid technology is implemented as system 800. In this instance, the appliance 110 is powered by switching a main AC power source 810 to an auxiliary AC source derived from a battery 812 or other suitable DC source at the detection of the utility Demand Response control signal. In one example system, 800, the battery 812 relies upon a charge, such as a trickle charge provided through a rectifier 814. Additionally, the battery 812 is electrically coupled to a DC to AC inverter 816 to convert the DC current supplied by the battery into an AC source for powering the appliance 110. A switch 820 selects the main AC source 810 during non-peak periods and it selects the output of the inverter 800 during high peak periods once it receives the appropriate wireless connectivity command from the Home Hub 140 (or other suitable identifier including the smart meter 180) that ultimately comes from the utility 182. In at least one example, the Demand Response control signal also disables the smart rectifier 814 to remove all loads from the grid. As noted, during non-peak periods the smart rectifier 814 charges the battery to insure that it is always fully charged, and once charged, it disconnects or it provides a trickle charge to maintain and prolong the battery life.

It will be appreciated by one of ordinary skill in the art that while the present system 800 is illustrated as separate, distinct elements, any and/or all of the components may be alternatively integrally formed as desired. For example, while the appliance 110 is illustrated as a separate component from the switch 820, rectifier 814, etc., each and/or any of the described components may be integrally formed within the appliance 110 as desired.

Figure 9:
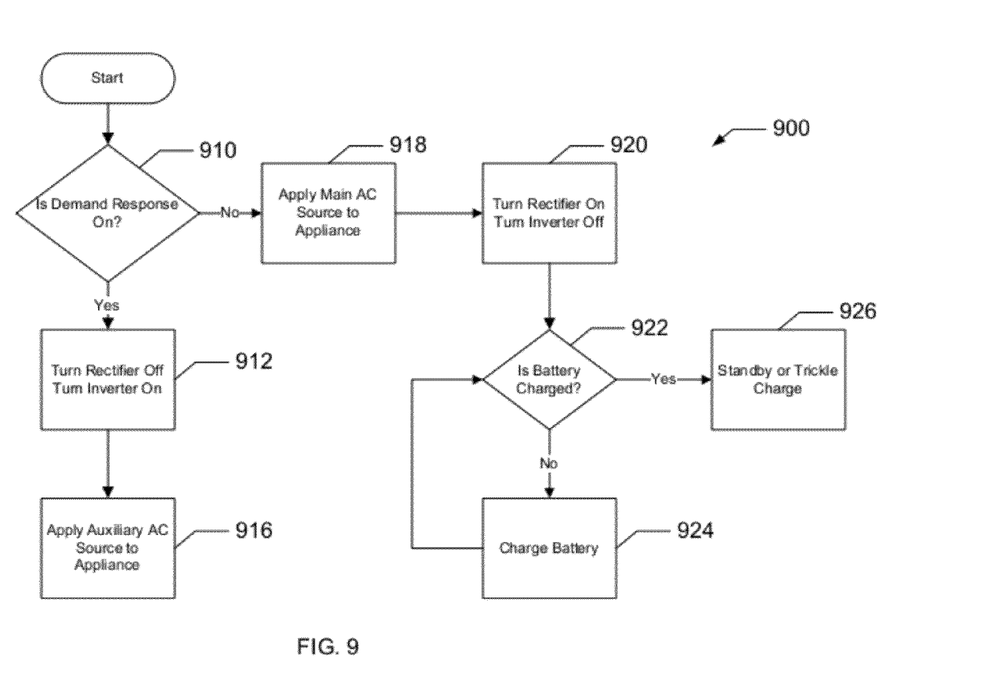
FIG. 9 is a flow chart describing an example hybrid energy management process for controlling the system of FIG. 8.

An example hybrid energy management process 900 for controlling the system, 800 is illustrated in FIG. 9. In this example, the process 900 is utilized to control the power source of the appliance 110. In particular, the process 900 starts at a block 910 by determining whether the Demand Response limitation is currently being imposed by the smart grid. Specifically, the switch 820 may be provided with a processor (not shown) such as the processing unit 22 that may detect the current response mode of the smart grid, through the smart meter 180. If the smart grid is currently in a Demand Response, processing continues at a block 912, where the rectifier 814 is turned off, and the inverter 816 is turned on. The switch 820 may then apply the auxiliary AC source to the appliance 110 at block 916, and processing may return to the block 910 for continuing the monitoring of the Demand Response period.

If, however, the process 900 determines that the utility is not in the Demand Response period at block 910, the process may continue with a block 918, in which the switch 810 applies the main AC source 810 to the appliance 110. Processing then continues at block 920 where the rectifier 814 is turned on and the inverter 816 is turned off. In at least one example, the rectifier 814 is a smart rectifier, and accordingly, the rectifier 814 may be utilized by the process 900 to determine whether the battery is fully charges at block 922. If the batter is not fully charged, the process 900 may provide a charging current to the battery at 924, otherwise, the battery 812 may be provided with a trickle charge or may be otherwise placed in a standby mode at block 926. Of course, as with the block 916, during the charge mode and/or standby/trickle mode, processing may return to the block 910 for continuing the monitoring of the Demand Response period as desired.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An appliance comprising:
   a main alternating current (AC) power supply electrically coupled to a utility grid;
   a secondary AC power supply electrically isolatable from the utility grid; and
   a switch coupled in parallel to each of the AC power supplies and having a controller electrically coupled to the utility grid to determine when the utility grid is in a reduced demand mode,
   wherein the switch selectably switches between powering the appliance with the main alternating current power supply when the utility is not in a reduced demand mode and powering the appliance with the secondary alternating current power supply when the utility is in a reduced demand mode.

2. An appliance as defined in claim 1, wherein the secondary AC power supply comprises a battery.

3. An appliance as defined in claim 2, wherein the battery is a direct current (DC) battery and wherein the appliance further comprises an inverter to convert the DC battery to an AC power source.

4. An appliance as defined in claim 3, wherein the inverter is disabled when the appliance is utilizing the main AC power supply.

5. An appliance as defined in claim 3, wherein the inverter is enabled when the appliance is utilizing the secondary AC power supply.

6. An appliance as defined in claim 2, further comprising a rectifier coupled between the main AC power supply and the battery.

7. An appliance as defined in claim 6, wherein the rectifier is a smart rectifier.

8. An appliance as defined in claim 6, wherein the rectifier is configured to provide a charging current to the battery.

9. An appliance as defined in claim 6, wherein the rectifier is configured to provide a trickle charging current.

10. An appliance as defined in claim 6, wherein the rectifier is disabled when the appliance is utilizing the secondary AC power supply.

11. An appliance as defined in claim 6, wherein the rectifier is enabled when the appliance is utilizing the main AC power supply.

12. A method of switching an appliance between a main alternating current (AC) power supply and a secondary AC power supply comprising:
   providing a main alternating current (AC) power supply electrically coupled to a utility power grid;
   providing a secondary AC power supply electrically isolatable from the utility power grid;
   receiving at a switch of the appliance information regarding an operating mode of the utility power grid, the switch coupled in parallel to each of the AC power supplies;
   determining when the utility power grid is in a reduced demand operating mode based on the information received at the switch;
   switching, by the switch, between powering the appliance with the main alternating current power supply when the utility is not in a reduced demand operating mode and powering the appliance with the secondary alternating current power supply when the utility is in a reduced demand mode.

13. A method as defined in claim 12, further comprising inverting a battery to form the secondary AC power supply.

14. A method as defined in claim 13, further comprising disabling the inverter when the appliance is utilizing the main AC power supply.

15. A method as defined in claim 13, further comprising enabling the inverter when the appliance is utilizing the secondary AC power supply.

16. A method as defined in claim 13, further comprising providing a rectifier coupled between the main AC power supply and the battery.

17. A method as defined in claim 16, further comprising disabling the rectifier when the appliance is utilizing the secondary AC power supply.

18. A method as defined in claim 16, further comprising enabling the rectifier when the appliance is utilizing the main AC power supply.

* * * * *